United States Patent Office 3,412,068
Patented Nov. 19, 1968

3,412,068
WATER-SOLUBLE RESINS AND THEIR PREPARATION, SAID RESINS RESULTING FROM SIMULTANEOUS CONDENSATION OF A KETONE, AN ALDEHYDE, A MONOHYDRIC PHENOL AND RESORCINOL
Robert M. Gemmill, Jr., Woodbury, and John W. Schick, Cherry Hill, N.J., assignors to Mobil Oil Corporation, a corporation of New York
No Drawing. Continuation of application Ser. No. 369,008, May 20, 1964. This application Sept. 28, 1967, Ser. No. 671,485
8 Claims. (Cl. 260—50)

ABSTRACT OF THE DISCLOSURE

An improved water-soluble, thermosettable resin is produced by reacting an aldehyde, a ketone, and a phenol in a one-step polycondensation reaction that is catalyzed with a base, in which 1–25 mole percent of the phenol is recorcinol. In the final resin product, the molar proportions of aldehyde, ketone, and phenol present are between about 3 and about 6 moles of the aldehyde, between about 1 and about 1.5 moles of the ketone per mole of the phenol. These resins are useful as binders for bonded products made from fibers, particles, or sheets, which bonded products possess properties of high bond strength and are resistant against weakening of the bond from exposure to water. The use of resorcinol provides resins having improved solubility and longer shelf life. Resorcinol is the only polyhydroxy phenol found to give such improvement.

---

This application is a continuation of application Ser. No. 369,008, filed May 20, 1964, now abandoned.

This invention relates to improved water-soluble resins, and more particularly improved water-soluble ketone-aldehyde-phenol resins, which can be thermoset to provide binders for fibers, particles and sheets. The invention also relates to a process for making such resins, and to bonded products containing a binder produced by thermosetting such resins.

As is well known to those familiar with the art, a wide variety of construction boards have been produced by bonding fibers, particles, and sheets with suitable binders. Such boards include plywood, chip board, particle board, fiberboard, laminates and others. In this specification and the claims, the terms "fibers," "particles," and "sheets" encompass a wide variety of materials of mineral and vegetable origin, and synthetic organic materials like Dacron and nylon. Typical minerals from which construction materials can be made include gypsum, asbestos, fiberglass and the like. However, construction boards which are more economical for many purposes can be made by bonding fibers, particles or sheets of vegetable origin, usually cellulosic materials into desired configurations. The term "cellulosic," as used herein, is embracive of substances from various plants and trees that contain the lignocellulosic complex. The term "cellulosic materials," therefore, as used herein includes fibers, chips, shavings, sheets, sawdust and the like derived from various plants and trees, and also includes hard woods, soft woods, cotton, bagasse, kenaf, hemp and jute.

A variety of materials have been proposed for use as binders for fibers, particles and sheets. Materials that can be thermoset to provide an infusible binder lending greater strength and durability to the bonded products are highly desirable. Phenol-formaldehyde, urea-formaldehyde and melamine-formaldehyde resins are among the numerous thermosettable materials that have been proposed for such uses.

However, products bonded with various types of previously-used thermosettable materials have often been found to lose bond strength more rapidly when exposed to the elements than when protected from the weather, as a result of gradual deterioration of the binders from frequent or prolonged contact with water. Accordingly, resins which can be thermoset to provide a binder which retains its strength despite exposure to weather or to water from other sources are especially desirable for obtaining bonds which are more durable in adverse environments, and particularly under severe weather conditions.

In addition to being thermosettable to provide bonds having high strength and good resistance to loss of strength from contact with water, the resins must be characterized by properties which facilitate their use as binder materials. Before being thermoset, the resins are most conveniently dissolved in a solvent for application to the fibers, particles or sheets as a solution or a paste-like slurry. To avoid the safety hazards associated with the use of organic solvents, especially at elevated temperatures, thermosettable resins which are water-soluble are highly desirable. Further, it is highly desirable that the resin be water-soluble throughout a broad range of concentrations so that it can be transported in solutions of relatively high concentrations or applied in any of various concentrations most convenient for the particular thermosetting process. Additionally, it is desirable that the resin solutions have good shelf life, i.e., that they do not become less water-soluble and precipitate from solution during intervals of storage or transport.

However, most thermosettable resins used in the past have exhibited significant water-solubility only in conjunction with relatively low molecular weights and correspondingly low viscosities. During the thermosetting process, which employs elevated temperatures and pressures, resins of low viscosity tend to penetrate the material being bonded, often leaving insucient binder at the bonding points and resulting in an unacceptably weak bond. Specifically, ketone-aldehyde resins having a molar ratio of between one and two moles of aldehyde per mole of ketone have had sufficient viscosity for acceptable bond only in water-insoluble forms requiring the use of an organic solvent such as an alcohol or an ester. It has been proposed that resins which are more water-soluble might be produced by the reaction of between 3 and 5 moles of aldehyde with each mole of ketone, but the resins so produced do not cure to give satisfactory bond strength. To the best of our knowledge, ketone-aldehyde resins used in the past are completely or largely water-insoluble, requiring the addition of an organic solvent before application to the materials to be bonded, or they have not provided satisfactory bond strength on being thermoset.

It has also been proposed that incorporation of a phenolic compound in the resin might enhance its curing characteristics and bond strength but, to the best of our knowledge and with the exception of the resin disclosed in copending application for Letters Patent, Ser. No. 354,435, filed Mar. 24, 1964, by Robert M. Gemmill, Jr., John W. Schick and John H. Stockinger, the ketone-aldehyde-phenol resins used in the past have also been water-insoluble or only poorly water soluble, again necessitating the use of an organic solvent for convenient application of the resin to the materials to be bonded.

As disclosed in the aforementioned copending Application Ser. No. 354,435, resins which are highly water-soluble, even in solutions which are substantially neutral, e.g. having a pH of between 7.0 and 9.0, and which can be thermoset to provide bonds which retain good strength, even under exposure to water or severe weather conditions, can be produced by the reaction of controlled proportions of a ketone reactant, an aldehyde reactant and a phenol reactant in the presence of a basic catalyst.

It has now been found that improved resins which are highly water-soluble throughout even greater ranges of resin concentrations, even in substantially neutral solutions and for extended periods of time, and which have viscosities and other characteristics suitable for being thermoset to provide bonds which retain good strength, even under adverse weather conditions or other exposure to water, can be produced by the reaction of controlled proportions of a ketone, an aldehyde, a monohydroxy phenolic compound and resorcinol in the presence of a basic catalyst.

Accordingly, it is a broad object of this invention to provide an improved binder for fibers, particles and sheets. Another object is to provided bonded products bonded with the improved binder. Another object is to provide an improved water-soluble resin of desirably high viscosity, which can be thermoset to provide such an improved binder. A specific object is to provide a resin of improved water-solubility throughout a range of resin concentrations, which can be thermoset to provide a binder for cellulosic materials and which can be prepared by reaction of a ketone, an aldehyde, a monohydroxy phenolic compound and resorcinol. Another specific object is to provide bonded products comprising cellulosic materials and a binder produced by thermosetting such a resin, and having high bond strength and good resistance to bond strength deterioration from exposure to water and adverse weather conditions. Other objects and advantages of this invention will become apparent to those skilled in the art, from the following detailed description.

In general, the present invention provides an improved water-soluble resin which can be thermoset to provide a binder for bonded products made from fibers, particles or sheets, which bonded products have properties of high bond strength and resistance against weakening of the bond from exposure to water. The improved water-soluble resin of this invention comprises the product of the reaction of an aldehyde, a ketone and at least two phenolic compounds in molar proportions of between about 2 and about 8 moles of aldehyde per mole of the phenolic compounds and of between about 0.5 and about 2 moles of ketone per mole of the phenolic compounds, and in the presence of a base capable of catalyzing the condensation reaction of the aldehyde, the ketone and the phenolic compounds, said phenolic compounds comprising a monohydroxy phenolic compound and resorcinol, and said resorcinol constituting between about one mole percent and about 25 mole percent of said phenolic compounds.

The foregoing molar proportions of aldehyde, ketone and phenolic compounds in the resin of this invention can be alternatively expressed on the basis of a mole of the ketone. So expressed, the aldehyde, ketone and phenolic compounds are present in the resin in molar proportions of between about 1 and about 16 moles of aldehyde per mole of ketone and between about 0.5 and about 2 moles of phenolic compounds per mole of ketone, said phenolic compounds comprising a monohydroxy phenolic compound and resorcinol, and said resorcinol constituting between about one mole percent and about 25 mole percent of said phenolic compounds.

The invention also includes the process of making such resin, which process comprises reacting an aldehyde, a ketone and at least two phenolic compounds in molar proportions of between about 2 and about 8 moles of aldehyde per mole of the phenolic compounds and of between about 0.5 and about 2 moles of ketone per mole of the phenolic compounds, and in the presence of a base capable of catalyzing the condensation reaction of the aldehyde, the ketone and the phenolic compounds, said phenolic compounds comprising a monohydroxy phenolic compound and resorcinol, and said resorcinol constituting between about one mole percent and about 25 mole percent of said phenolic compounds.

The invention also provides a bonded product, e.g. one comprising cellulosic material, bonded with a binder produced by thermosetting the water-soluble resin of this invention.

The ketone reactant used in the preparation of the resin of this invention can be any ketone having at least one hydrogen atom on each carbon atom alpha to the carbonyl group, or a mixture of two or more of such ketones. Suitable ketones include the aliphatic, particularly lower alkyl, and the cycloaliphatic ketones. Non-limiting examples of the ketone reactant are acetone, methyl ethyl ketone, ethyl ketone, methyl propyl ketones, methyl butyl ketones, ethyl propyl ketones, dihexyl ketone, cyclohexanone, acetonyl acetone, diacetone, and mixtures of any of the foregoing ketones. Preferred ketone reactants are acetone, methyl ethyl ketone and other ketones having alkyl groups containing up to three carbon atoms attached to the carbonyl group, with acetone being particularly preferred.

The aldehyde reactant used in the preparation of the resin of this invention can be any compound having an active

group characteristic of the aldehydes. Suitable aldehyde reactants include the aliphatic aldehydes and aromatic aldehydes, including heterocyclic aldehydes. Non-limiting examples of suitable aldehyde reactants are formaldehyde (including polymeric forms, e.g. paraformaldehyde) acetaldehyde, propionaldehyde, butyraldehyde, acrolein, crotonaldehyde, tiglaldehyde, benzaldehyde, salicylaldehyde, cinnamaldehyde, glyoxal and mixtures of any of the foregoing aldehydes. Formaldehyde, being inexpensive and readily available, is a preferred aldehyde reactant.

One of the two phenolic compounds required for preparation of the resin of this invention is monohydroxy phenolic compound which can be any monohydroxy phenol charactertized by having one hydroxy group attached to its nuclear ring and hydrogen atoms in at least two and preferably at least three active nuclear positions. Particularly suitable monohydroxy phenolics include unsubstituted phenol and substituted phenols such as alkyl phenols in which the alkyl groups are preferably lower alkyl groups, e.g. cresols. Other preferred types of substituted monohydroxy phenolics include meta-substituted phenols and various para-substituted phenols, e.g. p-amino phenol. Non-limiting examples of monohydroxy phenolics suitable for use in the reaction of this invention include phenol, cresols, xylenols, ethylphenols, propylphenols, butylphenols, amylphenos, phenyphenols, cyclohexylphenols and mixtures of any of the foregoing phenols. Mononuclear phenols of lower molecular weight are preferred, as are phenols which are relatively unemcumbered against ring reactions, such as, if a substituted monodydroxy phenolic reactant is desired, a phenol which is substituted by relatively few groups.

The other of the two phenolic compounds required for preparation of the resin of this invention is resorcinol (1,3-diyhdroxybenzene). It is an important aspect of this invention that the inclusion in the resin of between about one mole percent and about 25 mole percent of resorcinol, based on total phenolic compounds in the resin, is productive of a resin having a higher viscosity and having a high degree of water-solubility over greater ranges of resin concentration in the aqueous solutions, particularly in the lower ranges of resin concentrations. In general, and depending on the specific aldehyde, ketone and monohydroxy phenolic reactants used and the specific process conditions employed, an increase in the mole percentage of resorcinol included in the resin is accompanied by a reduction in the minimum resin concentration at which the resin is substantially completely water-soluble. With the particular ketone, aldehyde and monohydroxy phenolic reactants used in the specific examples described hereinafter, it was found that increases in the mole percentage of resorcinol in the resin between about one and about 8–10 mole percent, based on total phenolic compounds in the resin, were accompanied by increases in the maximum amount of water with which the resin could be diluted without diminishment of the substantially complete solubility of the resin in the aqueous solution, in some cases to an infinite amount of water; with further increases in the resorcinol content in the resin, between about 8–10 and about 25 mole percent, the maximum amount of water with which the resin could be diluted without diminishing its substantially complete solubility therein remained stable near the maximum corresponding to 8–10 mole percent resorcinol.

In the synthesis of the resin of this invention, the purity of the ketone, aldehyde and phenolic compounds in the reaction mixture is not critical, so long as there are the proper mole ratios of reactants in the mixture. Accordingly, the reactants need not be combined in their pure forms, but one or more of them may instead be added to the mixture in an impure form, such as in a form including side products resulting from the reaction or decomposition of other compounds to form the ketone, aldehyde, monohydroxy phenol or resorcinol. For example, the ketone and monohydroxy phenolic compound can be added to the reaction mixture in the form of the unpurified product of the decomposition of an aryldialkyl methylhydroperoxide. By way of illustration, when the desired ketone reactant is acetone and the desired monohydroxy phenolic reactant is unsubstituted phenol, cumene hydroperoxide can be conveniently decomposed under anyhydrous conditions to yield a cumene solution of acetone and phenol, which solution can be used in the process of this invention without purification or removal of decomposition by-products such as minor proportions of acetophenone and alpha-methyl styrene, and without impairment of the water-solubility of the resin produced or of the strength or water-resistance of the bond produced by thermosetting the resin. In general, ketone and phenolic reactants can be derived for use in the process of this invention by the decomposition of any aryldialkyl methylhydroperoxide having the Formula I:

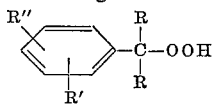

wherein R is alkyl and preferably lower alkyl ($C_1$–$C_3$), R' is alkyl or hydrogen and R" is alkyl, hydrogen or dialkyl methylhydroperoxide. The selection of a specific aryldialkyl methylhydroperoxide will depend on the nature and ratio of specific ketone and phenolic reactants desired for use in the resin-productive reaction. Non-limiting examples of aryldialkyl methylhydroperoxides suitable for this purpose include cumene methylhydroperoxide, dimethyl cumene hydroperoxide, methyl ethyl cumene hydroperoxide and diethyl cumene hydroperoxide. Since acetone is a preferred ketone and (unsubstituted) phenol a preferred phenol for purposes of this invention, cumene hydroperoxide is preferred as an aryldialkyl methylhydroperoxide which can be quantitatively decomposed to yield acetone and phenol. Similarly, a ketone reactant and resorcinol can be derived for use in the process of this invention by the decomposition of any aryldialkyl methlyhdroperoxide having the aforeshown Formula I, wherein R is alkyl and preferably lower alkyl ($C_1$–$C_3$), R' is alkyl or hydrogen, and R" is a dialkyl methylhydroperoxide group in a ring position which is meta with respect to the other dialkyl methylhydroperoxide on the ring.

The reaction productive of the water soluble resins of this invention is a condensation reaction which is base-catalyzed. The catalyst can be any base which is capable of catalyzing the reaction of the ketone reactant, the aldehyde reactant, the monohydroxy phenolic reactant and resorcinol. The catalyst will generally be added in a catalytic amount to the reaction mixture in the form of an aqueous solution, e.g. an aqueous solution having a concentration of between 1% and 20% of a strongly ionized base, such as sodium hydroxide or potassium hydroxide, or as a concentrated solution of a partially ionized base such as ammonium hydroxide, although the concentration of the base as added to the reaction mixture is not critical. In general practice, when a strongly ionized base is used, it will preferably be present in the reaction mixture in a concentration between 0.02 mole and 0.15 mole, and more preferably between 0.05 mole and 0.08 mole, of the base per mole of phenolic compounds initially present in the reaction mixture. When a partially ionized base is used, it will preferably be present in the reaction mixture in a concentration between 0.03 mole and 0.08 mole, and more preferably about 0.07 mole, per mole of phenolic compounds initially present in the reaction mixture.

It has been found that the ketone-aldehyde-monohydroxyphenol-resorcinol resin of this invention, which is water-soluble throughout a broad range of resin concentrations in aqueous solutions and which can be thermoset to effect a bond having good strength and high resistance against weakening of the bond by exposure to water or severe weather conditions, can be produced by controlling the proportions of ketone, aldehyde, monohydroxy phenol and resorcinol initially present in the reaction mixture from which the resin is condensed, and thereby controlling the proportions of ketone, aldehyde, monohydroxy phenol and resorcinol which condense to form the resin. The resin of this invention, which is believed to be a ketone-aldehyde-monohydroxy phenol-resorcinol copolymer, is the product obtained, as stated hereinbefore, by reacting a ketone, an aldehyde and at least two phenolic compounds in molar proportions of between about 2 and about 8 moles, preferably between 3 and 6 moles, of aldehyde per mole of the phenolic compounds and of between about 0.5 and about 2 moles, preferably between 1.0 and 1.5 moles, of ketone per mole of the phenolic compounds, said phenolic compounds comprising a monohydroxy phenolic compound and resorcinol, and said resorcinol constituting between about 1 mole percent and about 25 mole percent of said phenolic compounds.

It has been found that this resin can be obtained by reacting a ketone, an aldehyde, a monohydroxy phenol and resorcinol in the presence of a base capable of catalyzing reaction of the ketone, the aldehyde, the monohydroxy phenol and resorcinol, and in the presence of an excess of the ketone of between 50% and 100% over that proportion of said ketone which is reacted to form the aforedescribed ketone-aldehyde-monohydroxy phenol-resorcinol resin of this invention. With such an excess of ketone present, the ratios of aldehyde, ketone, and phenolic compounds initially present in the reaction mixture are between about 2 and about 8 moles of aldehyde per mole of the phenolic compounds and between about 0.7 and about 4 moles of ketone per mole of the phenolic compounds, said phenolic compounds comprising a monohydroxy phenolic compound and resorcinol, and said resorcinol constituting between about 1 mole percent and about 25 mole percent of said phenolic compounds. The immediately preceding molar ratios of ketone, aldehyde and phenolic compounds initially present in the reaction mixture can be alternatively expressed on the basis of a mole of ketone. So expressed, the ratios of ketone, aldehyde and phenolic compounds initially present in the reaction mixture are between about 0.5 and about 11 moles of aldehyde per mole of ketone and between about 0.2 and about 1.4 moles of the phenolic compounds per mole of ketone, said phenolic compounds comprising a monohydroxy phenolic compound and resorcinol, and said resorcinol constituting between about one mole percent and about 25 mole percent of said phenolic compounds.

The condensation reaction involved in this invention can be carried out in the presence of water, which can be introduced by adding the basic catalyst in aqueous solution or by charging at least a part of the aldehyde reactant in an aqueous solution, such as formalin when formaldehyde is the aldehyde reactant. The total amount of water used is not a critical factor, except that there should be sufficient water present to dissolve the resin product. There can be as much as 30 moles or more of water per mole of the phenolic compounds present in the reaction mixture, with the maximum amount of water used usually being limited only by the amount that can be handled, as a practical matter. After reaction, the water content of the resin solution can be adjusted as described hereinafter.

The reaction between the ketone, the aldehyde, the monohydroxy phenolic compound and resorcinol will generally be carried out at temperatures between about 125° F. and about 350° F. Within such a range of temperatures, the process is generally carried out at relatively higher temperatures when using a relatively less ionized base as the reaction catalyst, and at relatively lower temperatures when using a relatively more ionized base as reaction catalyst. In preferred practice, when a strongly ionized base, e.g. sodium hydroxide, is used as catalyst, the reaction will preferably be carried out at temperatures between 125° F. and 195° F., while the reaction will preferably be conducted at temperatures between 225° F. and 300° F. when the catalyst is a base which is only partially ionized, e.g. ammonium hydroxide. Within the aforesaid temperature ranges, a decrease in the strength of the base can generally be compensated by an increase in the reaction temperature. The reaction time required to produce the water-soluble resin of this invention will vary inversely with the reaction temperature and will be usually between 5 minutes and 4 hours, and more frequently between 30 minutes and 3 hours. When it is desirable to conduct the reaction at a slightly lower temperature for a slightly longer period of time, this can be accomplished by any suitable method of controlling the temperature of the reaction mixture, such as by removing heat of reaction from the reaction vessel by heat exchange, e.g. with a water-filled cooling jacket, or by controlling the rate of addition of the basic catalyst to the reaction mixture, e.g. by adding the catalyst continuously or in time-spaced increments rather than adding all of the catalyst to the mixture before reaction has begun.

It will be recognized that, at the reaction temperatures used, some or all of the catalyst, water, and many aldehyde and ketone reactants, will be volatile. Accordingly, in order to obtain good yields of the water-soluble resins of this invention, some provision should be made to retain the reactants in the reaction vessel. This can be done by using a reflux condenser. Preferably and more feasibly, the reaction can be carried out in an enclosed vessel, such as a kettle or an autoclave. In this case there will be a pressure build-up attributable to the vaporization of reactants.

Upon completion of the reaction, the resin product is present in a more or less viscous, aqueous solution. The basic catalyst can be destroyed by neutralization with an acid, such as hydrochloric acid or carbon dioxide. Following neutralization of the catalyst, the resin concentration in the solution can be adjusted, by adding or removing water, to any of the various levels desired for various commercial uses of the resin. The resin of this invention can be dissolved in concentrations as high as 65 wt. percent or more, which are desirable for thermosetting uses in which more dilute resin solutions might excessively penetrate the porous bonded surfaces and result in what is known as a "starved glue line" characterized by unacceptably low bond strength. To obtain such highly concentrated solutions, the removal of water is feasibly effected by heating the resin solution under reduced pressure. It has also been found that by the use of carefully controlled ratios of various forms of the aldehyde reactant and by carefully controlling the amount of water charged, it is possible to produce mixtures which, following reaction, contain as high as 65 wt. percent resin. For example, when formaldehyde is used as the aldehyde reactant, it can be introduced into the reaction mixture as a controlled ratio of formalin solution (37% formaldehyde) and paraformaldehyde, or as a controlled ratio of solid paraformaldehyde and water, to obtain a mixture which, following reaction, will contain about 65 wt. percent resin without further adjustment of the water content. Particularly in cases in which water resistance of the binder is not the most important of desired properties, the resin can be applied in this form for use as a thermoplastic binder for particles, fibers, sheets or other materials.

On the other hand, it is an important advantage of the resin of this invention that it is substantially completely water-soluble in relatively low concentrations, particularly in concentrations as low as 30 wt. percent and lower, which are appropriate for other commercial uses of the resin in which it is desirable to use a relatively dilute resin solution. It is another important advantage of the resin of this invention that it has a viscosity which is both low enough to facilitate its use in spray applications of aqueous solutions having a resin concentration as high as 65 wt. percent or higher, and high enough that it can be applied for thermosetting purposes in aqueous solutions having lower resin concentrations, e.g. between 30 wt. percent and 60 wt. percent or even lower, without excessive resin penetration of the porous surfaces to be bonded.

To produce bonded products having strong bonds and good resistance against weakening of the bonds from exposure to water, the water-soluble resin of this invention can be thermoset to form an insoluble, infusible polymer with the use of a basic catalyst. A mixture of a basic catalyst and a water solution of the resin, having proper viscosity, is applied to fibers, particles or sheets, and bonded products are formed therefrom by molding under heat and pressure to cure the resin to a thermoset polymeric binder. To form bonds of strength equivalent to or greater than that regarded in the industry as acceptable for conventional uses, the water-soluble resin of this invention should be applied, priod to being thermoset, in an aqueous solution having a proper resin concentration, e.g. between 30% and 65% or higher, and having a viscosity between about 5 seconds and about 9 seconds at between 62% and 65% resin content when measured by the Gardner-Holt method (ASTM Designation D1545–60) at ambient temperature (about 77° F.).

In cases where the reacted mixture containing the resin has the proper viscosity to be applied without water content adjustment, the condensation reaction catalyst present in the reacted mixture may suffice as the thermosetting catalyst, so that the addition of more catalyst would not be necessary. Otherwise, the basic catalyst used in the curing (thermosetting) step can be sodium carbonate or an inorganic base such as ammonium hydroxide or alkali or alkaline earth metal hydroxides (e.g. sodium hydroxide, potassium hydroxide, or calcium hydroxide), or an organic base such as a dialkylamine (e.g. dimethylamine or diethylamine), an alkylenediamine (e.g. ethylenediamine), a polyalkyleneamine (e.g., hexamethylenetetramine, diethylenetriamine or triethylenediamine), an alkyleneimine (e.g. pyrroline, pyrrolidine, piperidone or piperazine), an amine-terminated polyamide resin, or guanidine. The amount of basic catalyst used to effect the thermosetting cure is generally between about 0.5 percent and about 12 percent, by weight of the resin. Generally, about 2 to 8 percent is satisfactory.

As has been mentioned hereinbefore, the bonded products of this invention include particle board, fiber board and plywood. They are all prepared by the same general method of covering a surface of the fibers, particles or sheets with the binder, and the heating under pressure.

Particle board can be prepared from various particles manufactured for this use, or it can include wood particles found as waste in sawmills, lumber yards, carpentry shops, etc. Such waste particles can include sawdust, chips, or shavings. Waste ends can also be used, if they are comminuted to a proper particulate form. Wood particles coated with the binder and thermosetting catalyst are generally placed in a molding press of desired size and shape and subjected to heat and pressure. The compactness and hardness of the product particle board is governed to a great extent by the amount of pressure used. In general, pressures of from about 50 p.s.i.g. up to about 800 p.s.i.g. are employed. Molding is usually carried out at temperatures between about 300° F. and about 425° F. The molding temperature should not exceed temperatures in the order of about 450° F., above which charring of the cellulosic material may occur. The preferred molding time will be dependent upon the temperature and flow characteristics of the resin being thermoset. Time should be allowed to permit the resin to be distributed evenly and to thermoset sufficiently to provide a board of reasonable uniformity. The period of time can be between about 3 minutes and about 1 hour. In general practice, molding time will generally be between about 3 minutes and about 15 minutes.

Fiberboards are prepared by admixing mineral or vegetable fibers with the resin of this invention and catalyst. The resin of this invention is particularly advantageous for making fiberboards from relatively inexpensive or waste fibers, such as kenaf and bagasse. The mixture of fibers and binder is then molded into boards, using the techniques described for particle boards.

Plywoods are made by coating the surfaces of thin sheets of wood with mixtures of the resin and catalyst for thermosetting the resin. The coated wood sheets are then stacked one on top of another to the desired thickness, usually with the directions of the grain of adjacent sheets oriented at right angles to each other. The stack of sheets or plys is then heated under pressure, usually applied at right angles to the resin-coated surfaces.

If it is desirable to extend the resin of this invention, e.g. for economic reasons, this can be accomplished by adding a filler to the resin prior to the thermosetting step. Fillers which are suitable for this purpose, such as for example, clay, wood flour, soya flour, and dried blood, can be added in relatively large proportions without impairing the properties of good bond strength and resistance to bond weakening from the action of water which are characteristic of the binder obtained by thermosetting the resin of this invention.

The amount of resin applied to the cellulosic material to make the particle boards, fiberboards or plywood board should be sufficient that the finished board will contain, by weight, between about 4% and about 30% of binder.

The following specific examples are for the purpose of illustrating the preparation of the resin of this invention from a ketone, an aldehyde, a monohydroxy phenolic compound and resorcinol, and further demonstrate the effect of variables upon bond strength of the thermoset binder produced with the resins. It will be understood that this invention is not to be limited to the specific reactants and catalysts used in the examples, or to the particular operations and manipulations involved. Other ketone, aldehyde and monohydroxy phenolic reactants and catalyst as defined hereinbefore can be used, as those skilled in the art will readily appreciate.

Example I

A reaction mixture containing 116.0 grams (2 moles) of acetone, 90.0 grams of paraformaldehyde (3 moles of formaldehyde), 84.6 grams (0.9 mole) of phenol, 11.0 grams (0.1 mole) of resorcinol and 180 grams of water was heated to 140° F. with rapid stirring. 25 milliliters of 10% aqueous sodium hydroxide was continuously added over a period of 30 minutes, and the reaction mixture was then refluxed for 2.5 hours at 185° F. The product was stripped of all unreacted acetone and of sufficient water to raise the concentration of the aqueous solution to 59% resin solids. The viscosity of the 59% resin solution ranged from 1.5 to 3 seconds on the Gardner-Holt scale. It was found that the 59% resin solution could be diluted with additional water, in any volume up to an infinite amount, without decreasing the solubility of the resin content, i.e., without resulting in precipitation of any of the resin content from the aqueous solution.

In a second run identical to the first run of this example except that an additional 9.4 grams (0.1 mole) of phenol was substituted for the 0.1 mole of resorcinol, an aqueous solution containing 59% resin product had a Gardner-Holt viscosity of 1.2 seconds. The maximum volume of additional water with which the 59% resin solution could be diluted without causing precipitation of resin content was 1.45 times the volume of the 59% resin solution.

Data demonstrating lap shear strength of bonds obtained by thermosetting the resins productd in Runs 1 and 2 of this example are given in Table I.

Example II

A reaction mixture containing 116.0 grams (2 moles) of acetone, 90.0 grams of paraformaldehyde (3 moles of formaldehyde), 56.4 grams (0.6 mole) of phenol, 32.4 grams (0.3 mole) of m-cresol, 11.0 grams (0.1 mole) of resorcinol and 180 grams of water was heated to 140° F. with rapid stirring. 25 milliliters of 10% aqueous sodium hydroxide was continuously added over a period of 20 minutes, and the reaction mixture was then refluxed for 2.7 hours at 185° F. The product was stripped of all unreacted acetone and of sufficient water to raise the concentration of the aqueous solution to 62% resin solids. The viscosity of the 62% resin solution ranged from 5 to 13.2 seconds on the Gardner-Holt scale. It was found that the 62% resin solution could be diluted with additional water, in any volume up to an infinite amount, without impairing the solubility of the resin content, i.e., without causing precipitation of resin content from the aqueous solution.

In a second run identical to the first run of this example except that an additional 6.3 grams (0.067 mole) of phenol and 3.6 grams (0.033 mole) of m-cresol were substituted for the 0.1 mole of resorcinol, an aqueous solution containing 60% resin had a Gardner-Holt viscosity ranging from 2.5 to 4.3 seconds. The maximum volume of water with which the 60% resin solution could be diluted, without causing precipitation of resin content, was equal to the volume of the 60% resin solution.

Data demonstrating lap shear strength of bonds obtained by thermosetting the resins produced in Runs 1 and 2 of this example are given in Table I.

Shear stress tests were performed to determine the bonding strength of each of the binders produced by thermosetting, in the manner described hereinbefore, each of the resins produced as described in Examples I and II. Prior to the bond strength tests, 8 percent diethylenetriamine catalyst, based upon the weight of the resin, was admixed with the resin under test. The mixture of resin and catalyst was then used to coat one square inch of lapped birch veneers. The resins were cured at 350° F. for 10 minutes, at just sufficient pressure to hold the veneers together. Medical tongue depressors (½" by 6") were used as the birch veneers. The lapped samples were conditioned for 48 hours at 70° F. and 50% relative humidity. Thereafter, the stress required to pull the lapped section apart by shearing was determined on a Tinius Olsen Stress instrument and noted in Table I as the test result for a "dry" bond. Shear stress tests were also performed on other veneer bonds similarly prepared from the resins of Examples I and II, after the bonds had been water-soaked at room temperature for 48 hours and after they had been immersed in boiling water for 4 hours. The results of the lap shear stress tests are given in Table I.

TABLE I

|  | Lap Shear Strength, p.s.i.[1] | | |
|---|---|---|---|
|  | Dry | Soak | Boil |
| Example I: |  |  |  |
| Run 1 (resorcinol included) | 406 (60) | 387 (50) | 360 (40) |
| Run 2 (resorcinol omitted) | 458 (70) | 419 (80) | 355 (70) |
| Example II: |  |  |  |
| Run 1 (resorcinol included) | 419 (90) | 411 (80) | 337 (70) |
| Run 2 (resorcinol omitted) | 429 (100) | 430 (100) | 387 (100) |

[1] Values in parentheses indicate the percent of wood failure in each shear stress test.

From the data of Table I, it can be seen that, on being thermoset, the resorcinol-containing resins produced in the first runs of Examples I and II provided bonds having good shear strength and high resistance to loss of shear strength from the action of water on the bonds, and that the shear strength properties of the resorcinol-containing bonds were in general substantially equivalent to those of bonds provided by resins produced in the second runs of the corresponding examples and containing no resorcinol.

Although the present invention has been described with preferred embodiments, resort to modifications and variations can be had without departing from the spirit and scope of the invention, as those skilled in the art will readily appreciate. Such variations and modifications are therefore considered to be within the purview and scope of the appended claims.

What is claimed is:
1. A process for producing a thermosettable water-soluble resin useful as a binder for bonded products made from fibers, particles, or sheets, which bonded products possess properties of high bond strength and are resistant against weakening of the bond from exposure to water, said process comprising simultaneously reacting an aldehyde, a ketone, and at least two phenolic compounds, said phenolic compounds comprising a monohydric phenol and resorcinol and said resorcinol constituting between one mole percent and 25 mole percent of said phenolic compounds, in molar proportions of between 3 and 6 moles of the aldehyde per mole of the phenolic compounds and of between 1 and 1.5 moles of the ketone per mole of the phenolic compounds, in the presence of a base capable of catalyzing the condensation reaction of the aldehyde, the ketone, and the phenolic compounds, at a temperature of between 125° F. and 350° F., and for a period of time between 30 minutes and 3 hours; said molar proportions being the molar proportions of the aldehyde, the ketone, and the phenolic compound moieties in the resin product.

2. A process as defined in claim 1, in which the aldehyde is formaldehyde.

3. A process as defined in claim 1, in which the ketone is acetone.

4. A process as defined in claim 1, in which the monohydroxy phenolic compound is phenol.

5. A thermosettable water-soluble resin produced by simultaneously reacting an aldehyde, a ketone, and at least two phenolic compounds, said phenolic compounds comprising a monohydric phenol and resorcinol and said resorcinol constituting between one mole percent and 25 mole percent of said phenolic compounds, in molar proportions of between 3 and 6 moles of the aldehyde per mole of the phenolic compounds and of between 1 and 1.5 moles of the ketone per mole of the phenolic compounds, in the presence of a base capable of catalyzing the condensation reaction of the aldehyde, the ketone, and the phenolic compounds, at a temperature of between 125° F. and 350° F., and for a period of time between 30 minutes and 3 hours; said molar proportions being the molar proportions of the aldehyde, the ketone, and the phenolic compound moieties in the resin product.

6. A resin as defined in claim 5, in which the aldehyde is formaldehyde.

7. A resin as defined in claim 5, in which the ketone is acetone.

8. A resin as defined in claim 5, in which the monohydroxy phenolic compound is phenol.

No references cited.

WILLIAM H. SHORT, *Primary Examiner.*

H. SCHAIN, *Assistant Examiner.*